United States Patent
Root et al.

(10) Patent No.: US 12,393,108 B2
(45) Date of Patent: Aug. 19, 2025

(54) PIVOTING CAMERA ASSEMBLY FOR A REFRIGERATOR APPLIANCE

(71) Applicant: Haier US Appliance Solutions, Inc., Wilmington, DE (US)

(72) Inventors: Steven Keith Root, Buckner, KY (US); Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 124 days.

(21) Appl. No.: 18/325,609

(22) Filed: May 30, 2023

(65) Prior Publication Data

US 2024/0402578 A1    Dec. 5, 2024

(51) Int. Cl.
*G03B 17/56* (2021.01)
*F25D 29/00* (2006.01)

(52) U.S. Cl.
CPC ........... *G03B 17/561* (2013.01); *F25D 29/00* (2013.01); *F25D 2700/02* (2013.01)

(58) Field of Classification Search
CPC .... G03B 17/561; F25D 29/00; F25D 2700/02
See application file for complete search history.

(56) References Cited

U.S. PATENT DOCUMENTS

| | | | |
|---|---|---|---|
| 9,920,980 B2 | 3/2018 | Kim et al. | |
| 9,995,528 B1 | 6/2018 | Ebrom et al. | |
| 10,317,130 B2 * | 6/2019 | Alt | F21V 33/0012 |
| 10,408,529 B2 | 9/2019 | Grimminger et al. | |
| 10,852,053 B2 * | 12/2020 | Seo | F21V 33/00 |
| 11,143,450 B2 | 10/2021 | Sumihiro et al. | |
| 11,506,449 B2 * | 11/2022 | Uchida | F25D 23/028 |
| 2018/0195317 A1 * | 7/2018 | Okuma | E05F 15/40 |
| 2022/0065524 A1 * | 3/2022 | Schroeder | F25D 25/02 |

FOREIGN PATENT DOCUMENTS

| | | |
|---|---|---|
| CN | 206077537 U | 4/2017 |
| WO | WO2022193763 A1 | 9/2022 |

* cited by examiner

*Primary Examiner* — Leon W Rhodes, Jr.
(74) *Attorney, Agent, or Firm* — Dority & Manning, P.A.

(57) ABSTRACT

A refrigerator appliance includes a liner positioned within a cabinet and having an inner liner surface that defines a chilled chamber. A door is rotatably hinged to the cabinet to provide selective access to the chilled chamber and a camera assembly is mounted to the liner for monitoring the chilled chamber. The camera assembly includes a camera housing, a camera mounted within the camera housing and being pivotable between a first orientation and a second orientation, and a pivoting mechanism that is operably coupled to the door such that the camera is oriented in the first orientation when the door is in an open position and in the second orientation when the door is in a closed position.

17 Claims, 6 Drawing Sheets

PIVOTING CAMERA ASSEMBLY FOR A REFRIGERATOR APPLIANCE

FIELD OF THE INVENTION

The present subject matter relates generally to refrigerator appliances, and more particularly inventory management systems and camera assemblies for use in a refrigerator appliance.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Notably, it is frequently desirable to have an updated inventory of items that are present within the refrigerator appliance, e.g., to facilitate reorders, to ensure food freshness or avoid spoilage, etc. Thus, it may be desirable to monitor food items that are added to or removed from the refrigerator appliance. Certain conventional refrigerator appliances include cameras to obtain images within the chilled chamber for display to the user. However, these cameras commonly have a fixed orientation and do not provide any means for a user to adjust the field of view or regions monitored by the camera. Accordingly, such systems lack versatility, waste resources on imaging that is not useful, and may result in user dissatisfaction with the refrigerator appliance. Conventional camera systems may also be overly complex and costly.

Accordingly, a refrigerator appliance with systems for improved inventory management would be useful. More particularly, a refrigerator appliance that includes a camera assembly that facilitates improved viewing and monitoring of inventory would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided including a cabinet, a liner positioned within the cabinet, the liner having an inner liner surface that defines a chilled chamber, a door being rotatably hinged to the cabinet to provide selective access to the chilled chamber, and a camera assembly mounted to the liner for monitoring the chilled chamber. The camera assembly includes a camera housing, a camera mounted within the camera housing and being pivotable between a first orientation and a second orientation, and a pivoting mechanism that is operably coupled to the door such that the camera is oriented in the first orientation when the door is in an open position and in the second orientation when the door is in a closed position.

In another exemplary embodiment, a camera assembly for a refrigerator appliance is provided. The refrigerator appliance includes a liner positioned within a cabinet, the liner having an inner liner surface that defines a chilled chamber, and a door being rotatably hinged to the cabinet to provide selective access to the chilled chamber. The camera assembly includes a camera housing, a camera mounted within the camera housing and being pivotable between a first orientation and a second orientation, and a pivoting mechanism that is operably coupled to the door such that the camera is oriented in the first orientation when the door is in an open position and in the second orientation when the door is in a closed position.

In another exemplary embodiment, an appliance is provided including a cabinet defining a chamber, a door rotatably hinged to the cabinet to provide selective access to the chamber, and a camera assembly mounted to the cabinet for monitoring the chamber. The camera assembly includes a camera housing, a camera mounted within the camera housing and being pivotable between a first orientation and a second orientation, and a pivoting mechanism that is operably coupled to the door such that the camera is oriented in the first orientation when the door is in an open position and in the second orientation when the door is in a closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
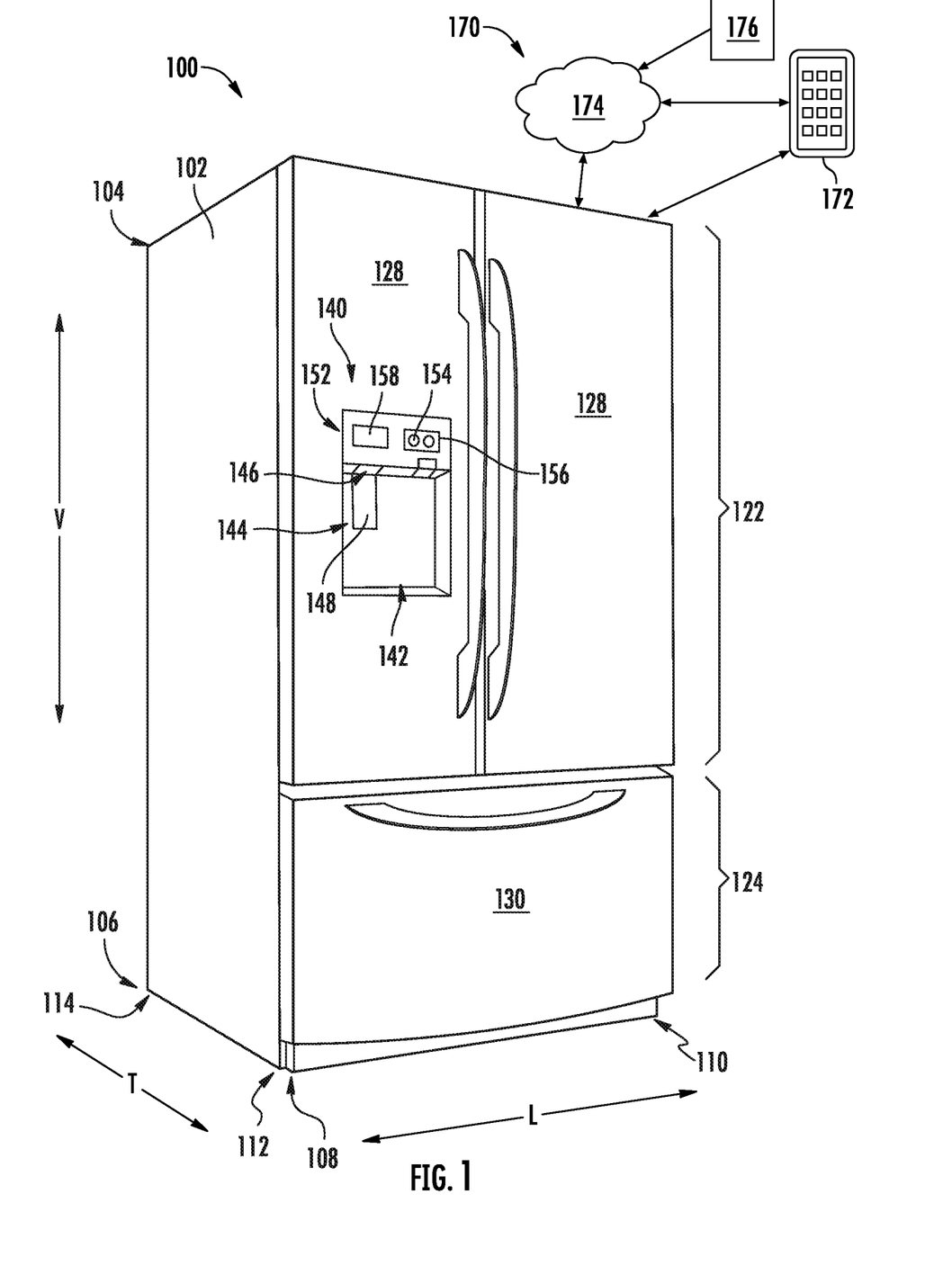
FIG. 1 provides a perspective view of a refrigerator appliance according to an exemplary embodiment of the present subject matter.
Figure 2:
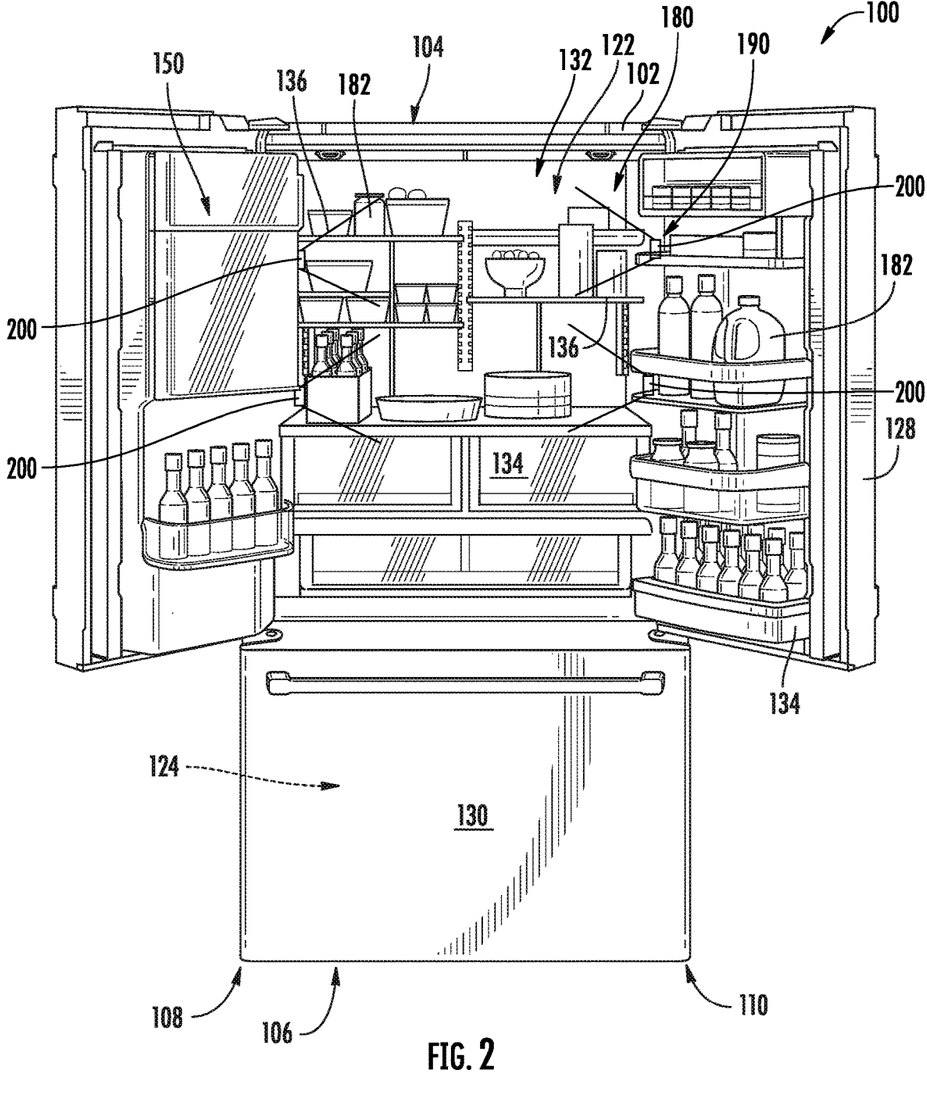
FIG. 2 provides a perspective view of the exemplary refrigerator appliance of FIG. 1, with the doors of the fresh food chamber shown in an open position to reveal an inventory management system having a plurality of cameras according to an exemplary embodiment of the present subject matter.
Figure 3:
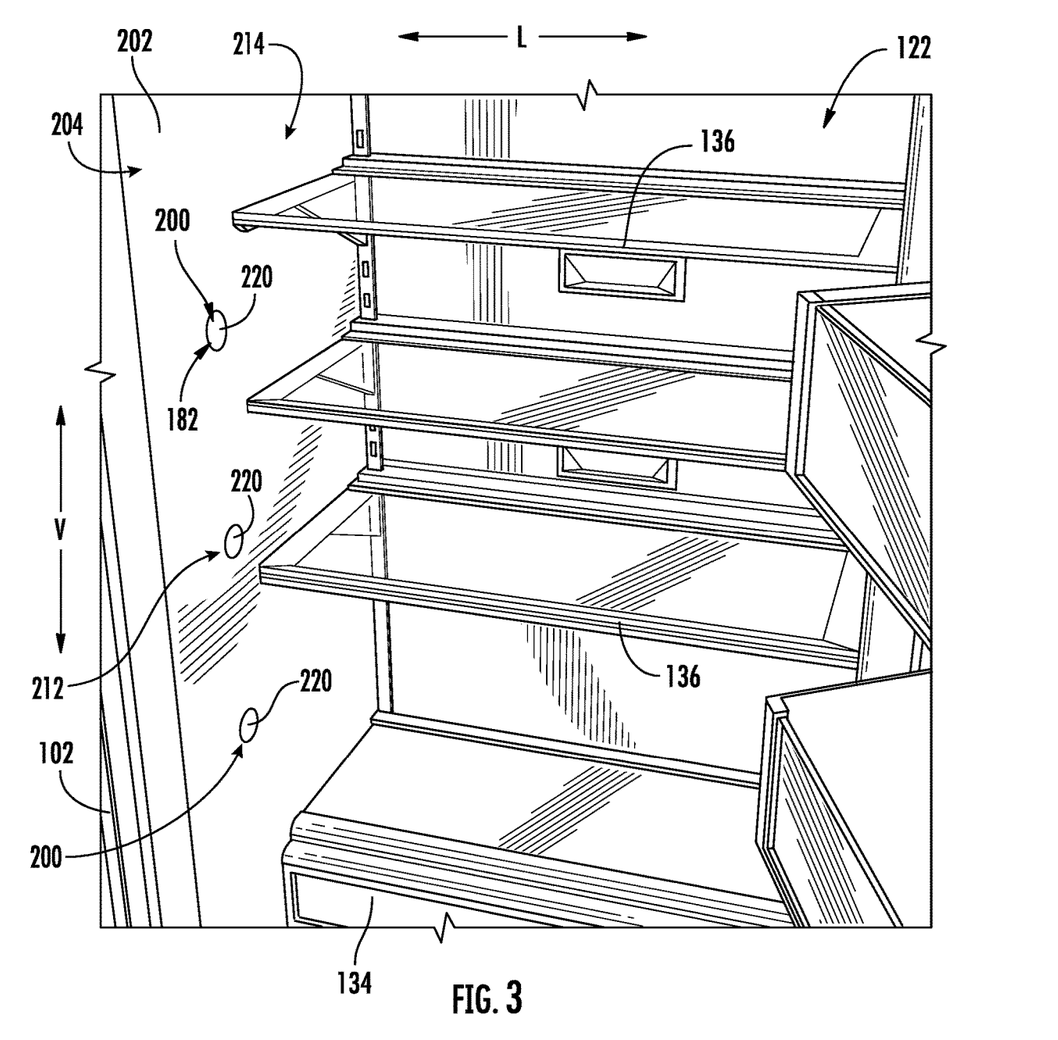
FIG. 3 provides a perspective view of the fresh food chamber and a camera assembly of the exemplary refrigerator appliance of FIG. 1 according to an exemplary embodiment of the present subject matter.
Figure 4:
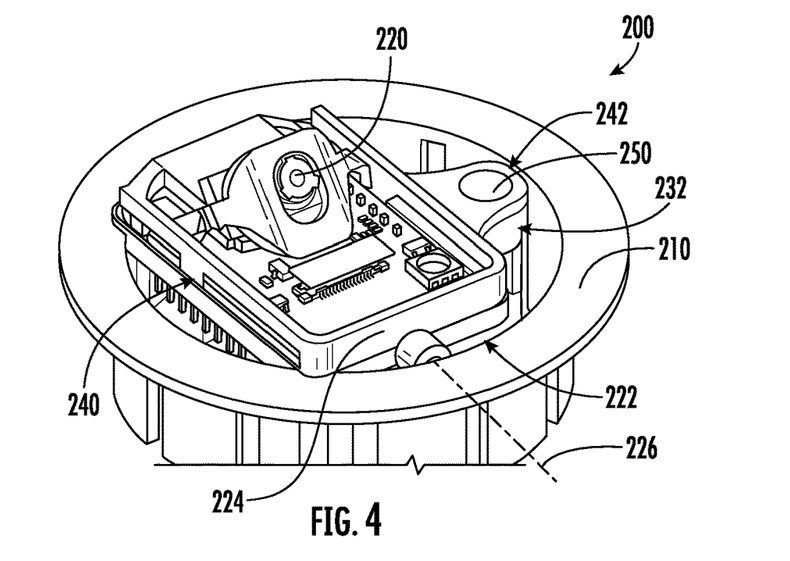
FIG. 4 provides a perspective view of a camera assembly that may be mounted on a sidewall of the exemplary refrigerator appliance of FIG. 1 according to an exemplary embodiment of the present subject matter.
Figure 5:
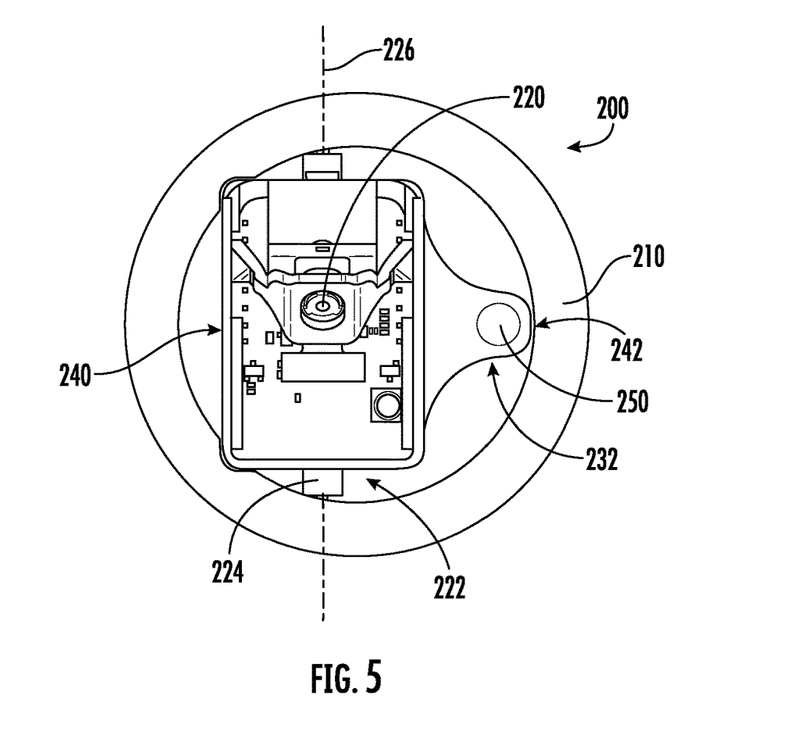
FIG. 5 provides a front view of the exemplary camera assembly of FIG. 4 according to an exemplary embodiment of the present subject matter.
Figure 6:
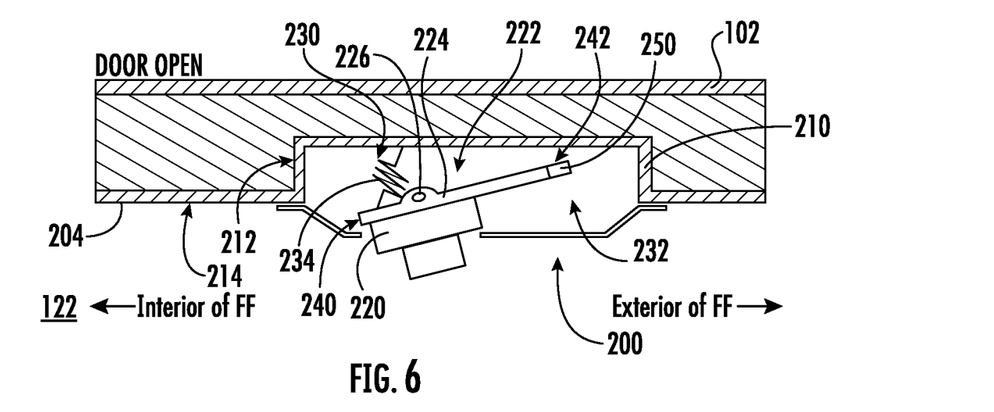
FIG. 6 provides a top, schematic view of the exemplary camera assembly of FIG. 4 when a door of the refrigerator appliance is open according to an exemplary embodiment of the present subject matter.
Figure 7:
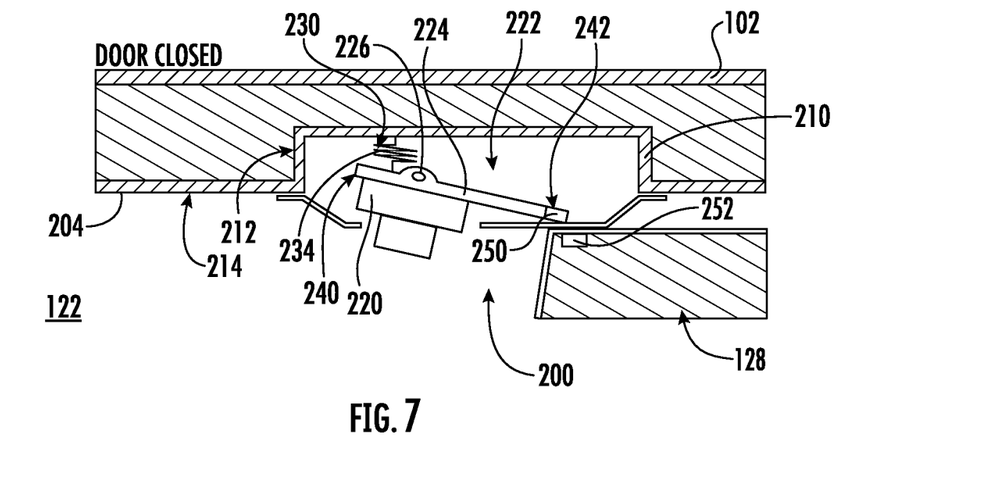
FIG. 7 provides a top, schematic view of the exemplary camera assembly of FIG. 4 when the door of the refrigerator appliance is closed according to an exemplary embodiment of the present subject matter.

Referring now to the figures, an exemplary appliance will be described in accordance with exemplary aspects of the present subject matter. Specifically, FIG. 1 provides a perspective view of an exemplary refrigerator appliance 100 and FIG. 2 illustrates refrigerator appliance 100 with some of the doors in the open position. As illustrated, refrigerator appliance 100 generally defines a vertical direction V, a lateral direction L, and a transverse direction T, each of which is mutually perpendicular, such that an orthogonal coordinate system is generally defined.

According to exemplary embodiments, refrigerator appliance 100 includes a cabinet 102 that is generally configured for containing and/or supporting various components of refrigerator appliance 100 and which may also define one or more internal chambers or compartments of refrigerator appliance 100. In this regard, as used herein, the terms "cabinet," "housing," and the like are generally intended to refer to an outer frame or support structure for refrigerator appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of refrigerator appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing appliance 102.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. In general, refrigerator doors 128 form a seal over a front opening 132 defined by cabinet 102 (e.g., extending within a plane defined by the vertical direction V and the lateral direction L). In this regard, a user may place items within fresh food chamber 122 through front opening 132 when refrigerator doors 128 are open and may then close refrigerator doors 128 to facilitate climate control. Refrigerator doors 128 and freezer door 130 are shown in the closed configuration in FIG. 1. One skilled in the art will appreciate that other chamber and door configurations are possible and within the scope of the present invention.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touchscreen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible by a processing device, including instructions that can be executed by processing device. Optionally, the instructions can be software or any set of instructions and/or data that when executed by the processing device, cause the processing device to perform operations.

Referring still to FIG. 1, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 156 of refrigerator appliance 100 to communicate with a separate device external to refrigerator appliance 100, referred to generally herein as an external device 172. As described in more detail below, these communications may be facilitated using a wired or wireless connection, such as via a network 174. In general, external device 172 may be any suitable device separate from refrigerator appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with refrigerator appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information. According to exemplary embodiments, remote server 176 may be configured to receive and analyze images obtained by camera assembly 200, e.g., to facilitate inventory analysis.

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with refrigerator appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now generally to FIG. 2, refrigerator appliance 100 may further include an inventory management system 180 that is generally configured to monitor one or more chambers of refrigerator appliance 100, e.g., to monitor the addition or removal of inventory. More specifically, as described in more detail below, inventory management system 180 may include a plurality of sensors, cameras, or other detection devices that are used to monitor fresh food chamber 122 to detect objects (e.g., identified generally by reference numeral 182) that are positioned in or removed from fresh food chamber 122. In this regard, inventory management system 180 may use data from each of these devices to obtain a complete representation or knowledge of the identity, position, and/or other qualitative or quantitative characteristics of objects 182 within fresh food chamber 122. Although inventory management system 180 is described herein as monitoring fresh food chamber 122 for the detection of objects 182, it should be appreciated that aspects of the present subject matter may be used to monitor objects or items in any other suitable appliance, chamber, etc.

As shown schematically in FIG. 2, inventory management system 180 may include one or more camera assemblies 200 that are generally positioned and configured for obtaining images of refrigerator appliance 100 during operation. Although camera assemblies 200 are described herein as being used to monitor fresh food chamber 122 of refrigerator appliance 100, it should be appreciated that aspects of the present subject matter may be used to monitor any other suitable regions of any other suitable appliance, e.g., such as freezer chamber 124. According to exemplary embodiments, camera assemblies 200 may be used to facilitate an inventory management process for refrigerator appliance 100. As such, each camera assembly 200 may be positioned in view of fresh food chamber 122 or around fresh food chamber 122 to monitor food items (identified generally as objects 182) that are being added to or removed from fresh food chamber 122.

It should be appreciated that the images obtained by camera assemblies 200 may vary in number, frequency, angle, resolution, detail, etc. in order to improve the clarity of the particular regions surrounding or within refrigerator appliance 100. In addition, according to exemplary embodiments, controller 156 may be configured for illuminating the chilled chamber using one or more light sources prior to obtaining images. Notably, controller 156 of refrigerator appliance 100 (or any other suitable dedicated controller) may be communicatively coupled to camera assembly 200 and may be programmed or configured for analyzing the images obtained by camera assembly 200, e.g., in order to identify items being added or removed from refrigerator appliance 100.

In general, controller 136 may be operably coupled to camera assemblies 200 for analyzing one or more images obtained by camera assembly 200 to extract useful information regarding objects 182 located within fresh food chamber 122. In this regard, for example, images obtained by camera assembly 200 may be used to extract a barcode, identify a product, monitor the motion of the product, or obtain other product information related to object 182. Notably, this analysis may be performed locally (e.g., on controller 156) or may be transmitted to a remote server (e.g., remote server 176 via external communication network 170) for analysis. Such analysis is intended to facilitate inventory management, e.g., by identifying a food item being added to or removed from the chilled chamber.

Although a plurality of camera assemblies 200 are illustrated in FIG. 2 as being mounted to sidewalls 202 of a refrigerator liner 204, it should be appreciated that refrigerator appliance 100 may include any other suitable number, type, position, and configuration of camera assemblies 200. For example, one or more camera assemblies 200 may be mounted on top wall 206 of liner 204. Indeed, camera assemblies 200 may be positioned in and around any chilled chamber and may each have a specified monitoring zone or range positioned around fresh food chamber 122. A camera assembly 200 will now be described according to a non-limiting example embodiment of the present subject matter.

Referring now generally to FIGS. 3 through 7, a camera assembly 200 will be described according to an example embodiment of the present subject matter. As shown, camera assembly 200 may generally include a camera housing 210 that is mounted to sidewalls 202 of a chilled chamber (e.g., such as fresh food chamber 122). For example, camera housing 210 may be positioned within an aperture 212 defined in liner 204 and may include a flange seated against an inner surface 214 of liner 204. In this regard, camera assembly 200 may be at least partially positioned between liner 204 and cabinet 102. According to example embodiments, camera assemblies 200 may further be foamed in place within liner 204.

As best shown in FIGS. 4 through 7, camera assembly 200 may include a camera 220 that is mounted within camera housing 210 and is pivotable between a first orientation and a second orientation. In this regard, according to the illustrated embodiment, camera assembly 200 may further include a pivoting mechanism 222 that is operably coupled with camera 220 and is configured for moving camera 220 between desired orientations in response to the position of the door 128. Although an example pivoting mechanism 222 is described below as moving camera 220 between the first orientation and the second orientation, it should be appreciated that any suitable mechanism capable of rotating camera 220 between any suitable orientations may be used while remaining within the scope of the present subject matter.

For example, cameras 220 may be mounted on a rotatable shaft that extends along the direction V. Door 128 may be mechanically coupled to the shaft through the top and bottom door hinge. Accordingly, when a user opens and closes door 128, the mechanical coupling between door and the vertical shaft may cause camera 220 to rotate between a first and second orientation. It should be appreciated that various other mechanisms and mechanical couplings may be used to actuate camera 220 based on the movement door 128, examples of which are defined below. Such mechanisms are contemplated as being within the scope of the present subject matter.

According to the illustrated example embodiment, pivoting mechanism 222 includes a pivot arm 224 that generally defines a pivot axis 226. Camera 220 may be positioned on pivot arm 224 such that rotating pivot arm 224 moves the field-of-view of camera 220 between various orientations. In this regard, pivot arm 224 may move to direct the field-of-view of camera 220 in different orientations. In general, as used herein the term "field-of-view" is generally intended to refer to the actual field-of-view or range of vision of camera 220 while the term "directed" is intended to refer to the primary focal point of camera 220 (e.g., at a center of the field-of-view).

In general, the field a few of camera 220 in the first orientation may be primarily directed outside of fresh food chamber 122 while the field-of-view of camera 220 in the second orientation may be primarily directed into fresh food chamber 122. In this regard, when door 128 a refrigerator appliance 100 is opened, camera assembly 200 may pivot camera 220 toward the threshold or opening of fresh chamber 122 or even outward toward a user refrigerator appliance 100.

In this manner, camera 220 may obtain images of one or more objects 182 being inserted into fresh food chamber 122. In addition, when door 128 is subsequently closed, camera assembly 200 may pivot camera 220 back to the second orientation such that the object 182 may be viewed within fresh food chamber 122 and more details regarding the object 182 may be obtained. Notably, this configuration may provide improved knowledge as to the objects 182 within fresh food chamber 122 without requiring any further manual intervention by a user of refrigerator appliance 100 and without additional cost and complexity of cameras, camera drive systems, etc.

Referring still generally to FIGS. 4 through 7, pivoting mechanism 222 may generally include a biasing element 330 that urges camera 220 toward the first orientation. In addition, pivoting mechanism 222 may include a trigger mechanism 232 that overcomes biasing element 230 to urge camera 220 toward the second orientation when door 128 is closed. According to the illustrated embodiment, biasing element 230 is a mechanical spring 234. In this regard, pivot arm 224 may have a first end 240 that is offset relative to pivot axis 226 and a second end 242 positioned opposite first end 240 relative to pivot axis 226. In this regard, a line drawn between first end 240 and second end 242 may be perpendicular to pivot axis 226 and camera 220 may be positioned somewhere between first end 240 and second end 242.

According to the illustrated embodiment, mechanical spring 234 is in compression between camera housing 210 and first end 240 of pivot arm 224. In this manner, mechanical spring 234 always urges pivot arm 224 toward a first orientation where camera 220 has a field-of-view directed primarily away from fresh food chamber 122 (e.g., across the threshold fresh food chamber 122 or toward a user of refrigerator appliance 100). Accordingly, when no force is exerted on second end 242 of pivot arm 224, camera 220 is biased toward the first orientation.

According to example embodiments, trigger mechanism 232 is mounted to the door 128 and is configured for engaging pivot arm 224 when the door 128 is close. In this regard, trigger mechanism 232 may be generally configured for overcoming the force exerted by biasing element 230 such that pivot arm 224 is rotated toward the second orientation. According to the illustrated embodiment, trigger mechanism 232 includes a camera magnet 250 that is mounted at second end 242 of pivot arm 224. In addition, trigger mechanism 232 includes a door magnet 252 that is mounted to door 128 for engaging (e.g., magnetically coupling) camera magnet 250 as door 128 is moved into the closed position. For example, door magnet 252 may be foamed in place within an inner door liner of door 128.

Notably, biasing element 230 and trigger mechanism 232 are two mechanical devices that are configured for interacting with pivot arm 224 in order to rotate pivot arm 224. It should be appreciated that these devices may be swapped or interchanged with equivalent devices or urging pivot arm 224 into the desired orientations. For example, mechanical spring 234 may be in tension instead of compression, the magnets 250, 252 may have opposite polarity, other mechanisms may be used, etc. The specific embodiments described herein are only exemplary and are not intended to limit the scope of the present subject matter in any manner.

According to the illustrated embodiment, the pivot axis 226 may be oriented along the vertical direction V when camera assemblies 200 are mounted on sidewalls 202 and may be oriented along the horizontal direction (e.g., such as the lateral direction L) when camera assemblies 200 are mounted on top wall 206. In addition, although pivoting mechanism 222 is described as moving camera 220 between the first orientation and a second orientation, it should be appreciated that pivoting mechanism 222 may be configured to move camera 220 between any suitable number of positions or orientations.

According to the illustrated embodiment, a pivot angle may be defined between camera 220 in the first orientation and the second orientation. In this regard, the pivot angle may be defined between the focal line or direction of the field-of-view of camera 220 between the first orientation in the second orientation. According to example embodiments, the pivot angle may be between about 5° and 60°, between about 15° and 45°, or about 30°. Other suitable pivot angles are possible and within the scope of the present subject matter.

Figure 8:
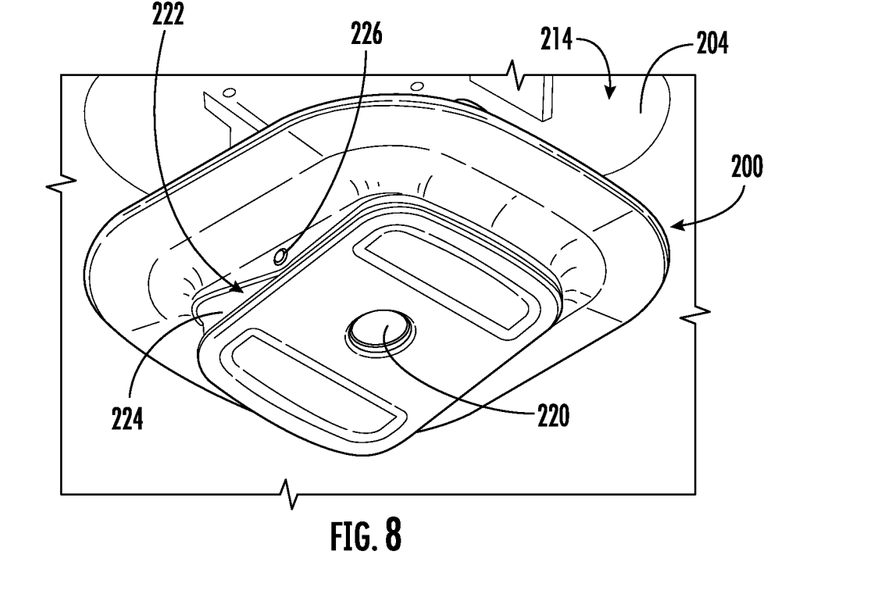
FIG. 8 provides a perspective view of a camera assembly that may be mounted on a top wall of the exemplary refrigerator appliance of FIG. 1 according to an exemplary embodiment of the present subject matter.
Figure 9:
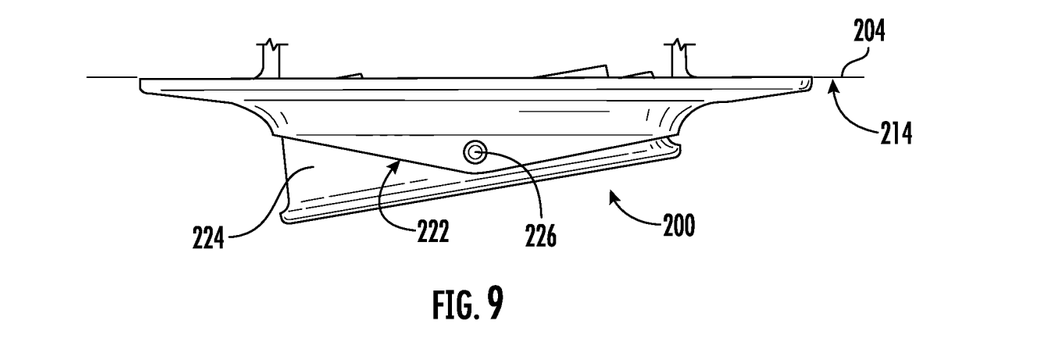
FIG. 9 provides a side view of the exemplary camera assembly of FIG. 8 according to an exemplary embodiment of the present subject matter.

Referring now briefly to FIGS. 8 and 9, camera assemblies 200 may be mounted in top wall 206 as illustrated according to an example embodiment. It should be appreciated that the mechanisms used to pivot camera assembly 200 between the first orientation and the second orientation may be similar to that described above with respect to FIGS. 4 through 7. Accordingly, such mechanisms will not be repeated here. However, it should be appreciated that due to the horizontal orientation of pivot axis 226, the weight of pivot arm 224 or a counterweight may be used to facilitate motion between the two orientations. In this regard, a biasing element may be omitted when camera assembly 200 is mounted in such an orientation (or a counterweight may itself act as such a biasing element). In addition, it should be appreciated that the trigger mechanism for overcoming the biasing element may be mounted to a top side of door 128. For example, trigger mechanism 232 may be located within an articulating mullion of the door 128.

As explained herein, aspects of the present subject matter are generally directed to a system that utilizes a camera or a set of cameras to view a threshold of a fridge when a door is open and pivot the camera(s) to view inside the fridge when the door is closed. The system may use a simple magnetic catch and mechanical pivot-axis, such that a magnet is embedded in a foamed door to interact with a motion arm of a camera mechanism. Therefore, a single feature camera used for inventory management can also provide images of items stored on shelves. In addition, the complexity of such an assembly is low, reliability is improved, and costs are reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet;
   a liner positioned within the cabinet, the liner having an inner liner surface that defines a chilled chamber;
   a door being rotatably hinged to the cabinet to provide selective access to the chilled chamber; and
   a camera assembly mounted to the liner for monitoring the chilled chamber, the camera assembly comprising:
      a camera housing;
      a camera mounted within the camera housing and being pivotable between a first orientation and a second orientation; and
      a pivoting mechanism that is operably coupled to the door such that the camera is oriented in the first orientation when the door is in an open position and in the second orientation when the door is in a closed position, wherein the pivoting mechanism comprises a biasing element that urges the camera toward the first orientation and a trigger mechanism that overcomes the biasing element to urge the camera toward the second orientation when the door is closed, wherein the trigger mechanism is located within an articulating mullion of the door.

2. The refrigerator appliance of claim 1, wherein the pivoting mechanism comprises:
   a biasing element that urges the camera toward the first orientation; and
   a trigger mechanism that overcomes the biasing element to urge the camera toward the second orientation when the door is closed.

3. The refrigerator appliance of claim 2, wherein the biasing element is a mechanical spring.

4. The refrigerator appliance of claim 2, wherein the camera assembly further comprises:
   a pivot arm defining a pivot axis, a first end offset relative to the pivot axis, and a second end positioned opposite the first end relative to the pivot axis, wherein the biasing element is in compression between the camera housing and the first end of the pivot arm.

5. The refrigerator appliance of claim 2, wherein the trigger mechanism comprises:
   a camera magnet mounted offset relative to a pivot axis of the camera; and
   a door magnet mounted to the door for engaging the camera magnet as the door is moved into the closed position.

6. The refrigerator appliance of claim 5, wherein the camera assembly further comprises:
   a pivot arm having a first end offset relative to the pivot axis, and a second end positioned opposite the first end relative to the pivot axis, wherein the camera magnet is mounted to the second end of the pivot arm.

7. The refrigerator appliance of claim 5, wherein the door magnet is embedded in foam within an inner door liner.

8. The refrigerator appliance of claim 5, wherein the pivoting mechanism comprises a linkage arm that extends from the door for engaging the camera.

9. The refrigerator appliance of claim 1, wherein the first orientation of the camera includes a field of view that is primarily directed outside the chilled chamber and the second orientation of the camera includes a field of view that is primarily directed into the chilled chamber.

10. The refrigerator appliance of claim 1, wherein a pivot angle is defined between the camera in the first orientation and the second orientation, the pivot angle being between about 15 and 45 degrees.

11. The refrigerator appliance of claim 10, wherein the pivot angle is about 30 degrees.

12. The refrigerator appliance of claim 1, wherein the liner defines an aperture that passes through the liner, and wherein at least a portion of the camera assembly is positioned between the liner and the cabinet adjacent the aperture.

13. The refrigerator appliance of claim 1, wherein the refrigerator appliance comprises a plurality of light assemblies mounted to sidewalls of the liner, the plurality of light assemblies being spaced apart along a vertical direction.

14. The refrigerator appliance of claim 1, wherein the camera assembly is mounted in a sidewall of the chilled chamber and a pivot axis of the camera extends along a vertical direction.

15. The refrigerator appliance of claim 1, wherein the camera assembly is mounted in a top wall of the chilled chamber and a pivot axis of the camera extends within a horizontal plane.

16. A camera assembly for a refrigerator appliance, the refrigerator appliance comprising a liner positioned within a cabinet, the liner having an inner liner surface that defines a chilled chamber, and a door being rotatably hinged to the cabinet to provide selective access to the chilled chamber, the camera assembly comprising:
   a camera housing;
   a camera mounted within the camera housing and being pivotable between a first orientation and a second orientation;
   a pivoting mechanism that is operably coupled to the door such that the camera is oriented in the first orientation when the door is in an open position and in the second orientation when the door is in a closed position, wherein the pivoting mechanism comprises a biasing element that urges the camera toward the first orientation and a trigger mechanism that overcomes the biasing element to urge the camera toward the second orientation when the door is closed; and
   a pivot arm defining a pivot axis, a first end offset relative to the pivot axis, and a second end positioned opposite the first end relative to the pivot axis, wherein the biasing element is in compression between the camera housing and the first end of the pivot.

17. An appliance comprising:
   a cabinet defining a chamber;
   a door rotatably hinged to the cabinet to provide selective access to the chamber; and
   a camera assembly mounted to the cabinet for monitoring the chamber, the camera assembly comprising:
      a camera housing;

a camera mounted within the camera housing and being pivotable between a first orientation and a second orientation; and a pivoting mechanism that is operably coupled to the door such that the camera is oriented in the first orientation when the door is in an open position and in the second orientation when the door is in a closed position, wherein the pivoting mechanism comprises a biasing element that urges the camera toward the first orientation and a trigger mechanism that overcomes the biasing element to urge the camera toward the second orientation when the door is closed; and a pivot arm defining a pivot axis, a first end offset relative to the pivot axis, and a second end positioned opposite the first end relative to the pivot axis, wherein the biasing element is in compression between the camera housing and the first end of the pivot arm.

* * * * *